Figure 1:
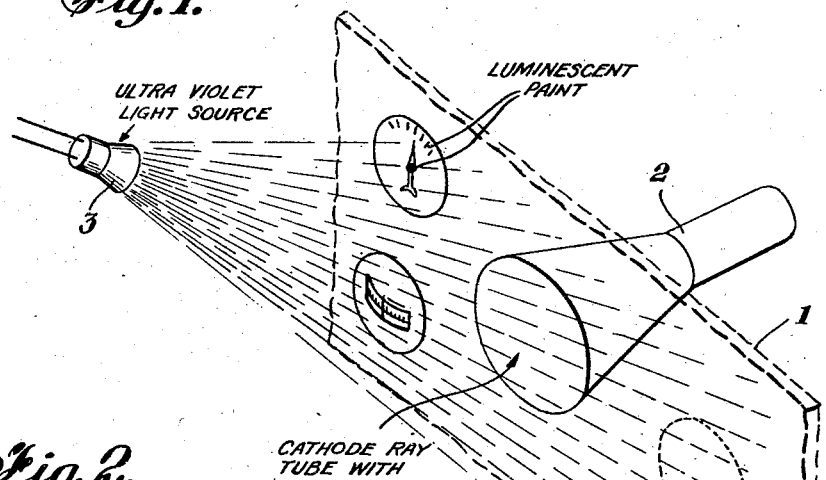

March 2, 1948. H. WOLFSON 2,436,847
CATHODE RAY TUBE AND VISUAL INDICATING SYSTEM FOR
APPARATUS INCLUDING CATHODE RAY TUBE
Filed July 29, 1943

INVENTOR.
HENRY WOLFSON
BY
ATTORNEY

Patented Mar. 2, 1948

2,436,847

UNITED STATES PATENT OFFICE 2,436,847

CATHODE-RAY TUBE AND VISUAL INDICATING SYSTEM FOR APPARATUS INCLUDING CATHODE-RAY TUBE

Henry Wolfson, London, England, assignor, by mesne assignments, to International Standard Electric Corporation, New York, N. Y., a corporation of Delaware Application July 29, 1943, Serial No. 496,661
In Great Britain May 10, 1940

Section 1, Public Law 690, August 8, 1946
Patent expires May 10, 1960

1 Claim. (Cl. 250—71)

This invention relates to cathode ray tubes and to visual indicating systems for apparatus including cathode ray tubes.

It is desirable in certain circumstances, for example, in those obtaining in an aeroplane, to arrange meters and indicators of various kinds to be visible in the dark. This may be done in one way by irradiating the indicator panel or its equivalent with ultra-violet light and by coating the indicators such as meter scales and pointers with luminescent paint. If, however, the apparatus includes a cathode ray tube, serving for example as a bearing indicator, the screen of the tube would fluoresce under the influence of the ultra-violet light and, especially if such screen has a phosphorescent afterglow, any trace imposed electrically upon the screen would be masked or rendered invisible due to the bright fluorescence of the whole of the screen.

It is the object of this invention to overcome this objection.

According to one aspect the invention resides in a visual indicating system for apparatus including a cathode ray tube, comprising indicators or signs coated with or designated by luminescent paint, a source of ultra-violet light for rendering such indicators or signs visible in the absence of ordinary light and a light filter effective to pass visible light and to cut off light at and beyond the violet end of the spectrum, said light filter being arranged to shield the fluorescent screen of the cathode ray tube from the source of ultra-violet light.

According to another aspect the invention comprises a cathode ray tube having a fluorescent screen and a light filtering arrangement on the viewed side thereof and comprising a light filter permeable to visible light and substantially impermeable to light at and beyond the violet end of the spectrum.

Such a filter, which can be either sprayed directly on the outer surface of the screen end of the cathode ray tube or may be a separate entity, consists of a suitable medium, such as nitrocellulose, Celluloid, cellulose acetate, transparent resin, in which is incorporated a small quantity of a yellow dye or compound which gives the required complete absorption of ultra-violet light of all wavelengths.

In a specific example picric acid or sodium picrate is used. A number of yellow dyes give the required absorption. Thus illumination of the screen by ultra-violet light is completely prevented and at the same time the visible light emitted by the trace and by the afterglow (where present) is not sensibly absorbed, thus making little or no change in the apparent intensity of the trace, as compared with the intensity when viewed in a darkened enclosure not irradiated with ultra-violet light.

Figure 2:
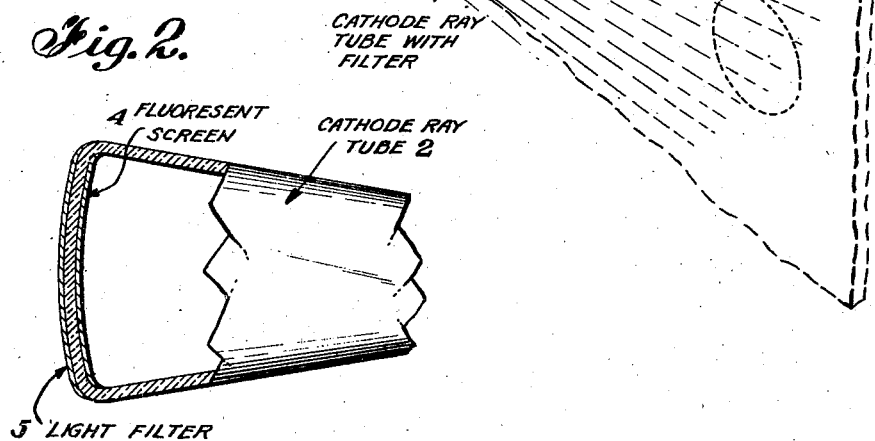
Figure 3:
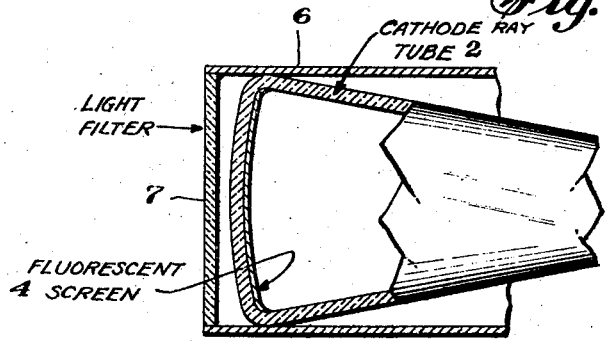

An illustrative embodiment of the invention is shown in the accompanying drawing wherein Fig. 1 shows a perspective view of an application of the invention while Figs. 2 and 3 show detail views of different ways of applying the light filter to the cathode ray tube.

Referring to the drawings, 1 is a panel including indicators or instrument dials in any conventional arrangement including also a cathode ray tube 2 whose viewing end is covered by a light filtering arrangement in accordance with this invention. The panel is shown illuminated or irradiated by a source of ultra-violet light 3. As shown in Fig. 2, a cathode ray tube has the usual fluorescent screen 4 and opposite to such screen is a form of the filtering arrangement. In this case it comprises the light filter 5 which may consist of a nitrocellulose or a transparent resin with which has been mixed a yellow dye such as picric acid or sodium picrate. This mixture can be sprayed on. When this is applied the dye component serves to absorb the ultra-violet rays.

In Fig. 3 the filtering arrangement takes the form of a separate entity comprising a casing 6, the front 7 of which is constituted by a sheet of transparent material which is mixed with the filter composition during manufacture. Such composition in this case may be Celluloid or cellulose acetate mixed with the aforesaid yellow dye. Such a casing when placed over the viewing end of the cathode ray tube performs as in the case of the arrangement in Fig. 2 to screen the effect of the ultra-violet light field from the fluorescent screen of the tube to preserve the apparent intensity of the indication thereon when viewed in darkness.

What is claimed is:

In combination in a visual indicating system comprising indicators designated by luminous paint, a cathode ray tube, a source of ultraviolet light for rendering such indicators visible in the absence of ordinary light, a light filter effective to pass visible light and to cut off light at and beyond the violet end of the spectrum, said light filter comprising a transparent medium having incorporated therein a dye compound selected from the group consisting of picric acid and sodium picrate and absorbing ultraviolet light and being arranged to shield the fluorescent screen of the cathode ray tube from said source of ultraviolet light.

HENRY WOLFSON.

REFERENCES CITED

The following references are of record in the file of this patent:

UNITED STATES PATENTS

| Number | Name | Date |
|---|---|---|
| 1,951,783 | Beard | Mar. 20, 1934 |
| 2,151,549 | Becker | Mar. 21, 1939 |

FOREIGN PATENTS

| Number | Country | Date |
|---|---|---|
| 426,789 | Great Britain | Oct. 5, 1933 |
| 507,037 | Great Britain | Oct. 11, 1938 |
| 396,601 | Great Britain | Dec. 7, 1932 |
| 426,797 | Great Britain | Oct. 10, 1933 |